US012501924B2

(12) United States Patent
Valentini et al.

(10) Patent No.: US 12,501,924 B2
(45) Date of Patent: Dec. 23, 2025

(54) COMPOSITIONS COMPRISING WHEY PROTEIN AND GUM ARABIC

(71) Applicant: COMPAGNIE GERVAIS DANONE, Paris (FR)

(72) Inventors: Céline Valentini, Chatillon (FR); Olivier Noble, Orsay (FR); Florian Bonnaud, Palaiseau (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 0 days.

(21) Appl. No.: 16/067,401

(22) PCT Filed: Dec. 30, 2015

(86) PCT No.: PCT/IB2015/002592
§ 371 (c)(1),
(2) Date: Jun. 29, 2018

(87) PCT Pub. No.: WO2017/115101
PCT Pub. Date: Jul. 6, 2017

(65) Prior Publication Data
US 2019/0116859 A1   Apr. 25, 2019

(51) Int. Cl.
*A23L 33/19* (2016.01)
*A23J 3/08* (2006.01)
*A23L 2/66* (2006.01)
*A23L 29/212* (2016.01)
*A23L 29/25* (2016.01)

(52) U.S. Cl.
CPC ............... *A23L 33/19* (2016.08); *A23J 3/08* (2013.01); *A23L 2/66* (2013.01); *A23L 29/212* (2016.08); *A23L 29/25* (2016.08); *A23V 2002/00* (2013.01); *A23V 2200/244* (2013.01); *A23V 2250/5028* (2013.01); *A23V 2250/5118* (2013.01); *A23V 2250/54252* (2013.01); *A23V 2300/24* (2013.01); *A23V 2300/26* (2013.01)

(58) Field of Classification Search
CPC ......... A23L 33/19; A23L 29/212; A23L 29/25
See application file for complete search history.

(56) References Cited

U.S. PATENT DOCUMENTS

| 4,587,131 A * | 5/1986 | Bodor ............. A23D 7/015 426/603 |
| 5,547,927 A | 8/1996 | Cope et al. |
| 2003/0044503 A1* | 3/2003 | Morgan ............. A23C 19/093 426/573 |
| 2011/0268680 A1 | 11/2011 | Zhong |
| 2014/0178556 A1* | 6/2014 | Yun ............. A23D 9/007 426/582 |

FOREIGN PATENT DOCUMENTS

| EP | 0 626 176 A2 | 11/1994 |
| EP | 1 149 534 A1 | 10/2001 |
| WO | WO 03/106014 A1 | 12/2003 |
| WO | WO 2006/090110 A1 | 8/2006 |
| WO | WO 2006/119064 A2 | 11/2006 |
| WO | WO 2007/110182 A2 | 10/2007 |
| WO | WO 2007/110422 A2 | 10/2007 |
| WO | WO 2009/011573 A1 | 1/2009 |
| WO | WO 2013/095131 A1 * | 6/2013 |

OTHER PUBLICATIONS

Babiker et al., "Effects of gum Arabic ingestion on body mass index and body fat percentage in healthy adult females: two-arm randomized, placebo controlled, double-blind trial", Nutr J. 2012I 11:111, Dec. 15, 2012, Retrieved from Internet URL: < https://www.ncbi.nlm.nih.gov/pmc/articles/PMC3570285/>. (Year: 2012).*
International Search Report, issued in PCT/IB2015/002592, dated Sep. 2, 2016.
Written Opinion of the International Searching Authority, issued in PCT/IB2015/002592, dated Sep. 2, 2016.
Akhtar et al. "Whey Protein-Maltodextrin Conjugates as Emulsifying Agents: An Alternative to Gum Arabic," Food Hydrocolloids, vol. 21, 2007, pp. 607-616.
İbanoğlu, "Rheological Behaviour of Whey Protein Stabilized Emulsions in the Presence of Gum Arabic," Journal of Food Engineering, vol. 52, 2002, pp. 273-277.
Klein et al., "Interactions Between Whey Protein Isolate and Gum Arabic," Colloids and Surfaces B: Biointerfaces, vol. 79, 2010 (published online Apr. 29, 2010), pp. 377-383.
Loveday et al., "Heat-Induced Colloidal Interactions of Whey Proteins, Sodium Caseinate and Gum Arabic in Binary and Ternary Mixtures," Food Research International, vol. 54, 2013, pp. 111-117.
Sağlam et al., "Concentrated Whey Protein Particle Dispersions: Heat Stability and Rheological Properties," Food Hydrocolloids, vol. 30, 2013, pp. 100-109.
Schmitt et al., "Complex Coacervation Between β-Lactoglobulin and Acacia Gum in Aqueous Medium," Food Hydrocolloids, vol. 13, 1999, pp. 483-496.
Schmitt et al., "Kinetics of Formation and Functional Properties of Conjugates Prepared by Dry-State Incubation of β-Lactoglobulin/Acacia Gum Electrostatic Complexes," Journal of Agricultural and Food Chemistry, vol. 53, 2005, pp. 9089-9099.
Schmitt et al., "Protein/Polysaccharide Complexes and Coacervates in Food Systems," Advances in Colloid and Interface Science, vol. 167, 2011 (published online Oct. 20, 2010), pp. 63-70.
Valim et al., "Whey Protein/Arabic Gum Gels Formed by Chemical or Physical Gelation Process," Food Biophysics, vol. 4, 2009 (published online Dec. 9, 2008), pp. 23-31.

(Continued)

*Primary Examiner* — Stephanie A Kohler
(74) *Attorney, Agent, or Firm* — Birch, Stewart, Kolasch & Birch, LLP

(57) ABSTRACT

The invention relates to compositions comprising a high amount of whey protein. The compositions further comprise Gum Arabic. Such compositions have a good processability and/or texture.

12 Claims, No Drawings

(56) References Cited

OTHER PUBLICATIONS

Weinbreck et al., "Complex Coacervation of Whey Proteins and Gum Arabic," Biomacromolecules, vol. 4, No. 2, 2003 (published online Jan. 30, 2003), pp. 293-303.
Weinbreck et al., "Composition and Structure of Whey Protein/Gum Arabic Coacervates," Biomacromolecules, vol. 5, No. 4, 2004 (published online Apr. 23, 2004), pp. 1437-1445.
Weinbreck et al., "Rheological Properties of Whey Protein/Gum Arabic Coacervates," Journal of Rheology, vol. 48, No. 6, Nov./Dec. 2004, pp. 1215-1228.
Weinbreck et al., "Chapter 2: Complex Coacervation of Whey Protein and Gum Arabic," Biomacromolecules (2003), vol. 4, No. 2, pp. 293-303.
Wijayanti et al., "Stability of Whey Proteins During Thermal Processing: A Review," Comprehensive Reviews in Food Science and Food Safety (2014), vol. 13, pp. 1235-1251.
De Oliveira et al.,"Food Protein-polysaccharide Conjugates Obtained via the Maillard Reaction: A Review," Critical Reviews in Food Science and Nutrition, (2016), vol. 56, pp. 1108-1125.

\* cited by examiner

COMPOSITIONS COMPRISING WHEY PROTEIN AND GUM ARABIC

The invention relates to compositions comprising a high amount of whey protein. The compositions further comprise Gum Arabic. Such compositions have a good processability and/or texture.

Whey proteins at high concentrations in aqueous media are known to gel upon heat treatments, while this phenomenon does not occur and/or does not cause issues at low concentrations for example at whey protein concentrations as low as 3% by weight, or even at whey protein concentrations of up to 6%. This is particularly the case at neutral pH. The formation of the gel can foul the processing equipments. The higher the whey protein concentration is, the more difficult the processing is. Various documents describe compositions and processes to obtain liquid drinkable products having high amounts of whey proteins, for example by associating various compounds or types of proteins. However there is a need for other solutions, than can allow further increasing the concentration of whey protein while preserving good processability and/or textures.

Document WO 2006/119064 describes liquid or semi-liquid compositions comprising at least 2% of whey protein, and a preparation process involving heating. In the examples the compositions comprise up to 4.12% by weight of whey protein and some Gum Arabic. There is a need for compositions having higher concentrations of whey proteins.

Document WO 03/106014 describes compositions having complex coacervates of whey protein and gum arabic. The compositions comprise about 1% by weight of whey protein, with a ratio WP/GA between whey protein and gum arabic of about ½. They are not subjected to heat treatment. There is a need for compositions comprising higher concentrations of whey proteins.

Document [Ibanoglu, E (Ibanoglu, E) *JOURNAL OF FOOD ENGINEERING*, Volume: 52, Issue: 3, Pages: 273-277, Published: May 2002] describes oil in water emulsions (n-hexadecane in water) having a stabilizing or emulsifying system comprising whey protein and Gum Arabic. The compositions comprise more gum arabic than whey protein. There is a need for compositions comprising higher concentrations of whey proteins. Moreover using such large amounts of gum arabic, compared to the targeted whey protein is expensive. There is a need for compositions wherein aids to handling whey protein are present in lower amounts.

Document [Klein, M (Klein, Min)[1]; Aserin, A (Aserin, Abraham)[1]; Ben Ishai, P (Ben Ishai, Paul)[1]; Garti, N (Garti, Nissim)[1] *COLLOIDS AND SURFACES B-BIOINTERFACES*, Volume: 79, Issue: 2, Pages: 377-383, Sep. 1, 2010] describes interactions between whey protein and Gum Arabic, in compositions comprising at most 5% by weight of whey protein. There is a need for compositions comprising higher concentrations of whey proteins.

Document [Loveday, S M (Loveday, Simon M.)[1]; Ye, A Q (Ye, Aiqian)[1]; Anema, S G (Anema, Skelte G.)[2]; Singh, H (Singh, Harjinder)[1] *Food Research Internation*, Volume: 54, Issue: 1, Pages: 111-117 (November 2013)] describes heat induced interactions between whey protein, Gum Arabic and optionally sodium caseinate, in compositions comprising 1% by weight of whey protein. There is a need for compositions comprising higher concentrations of whey proteins.

Document [Saglam, D (Saglam, Dilek)[1,2]; Venema, P (Venema, Paul)[1]; de Vries, R (de Vries, Renko)[3]; Shi, J (Shi, Jing)[1]; van der Linden, E (van der Linden, Erik)[1] *FOOD HYDROCOLLOIDS*, Volume: 30, Issue: 1, Pages: 100-109, Published: January 2013] describes compositions comprising 9% by weight of whey protein in colloid form and 1% by weight of Gum Arabic. This document teaches that with such colloid forms, with a ratio of Gum Arabic to whey protein of 1.1 no effect on viscosity is observed. There is a need for solution allowing to lower viscosities. Colloidal forms require specific complex processes by water in oil emulsification and then separation, that are not preferred as complex and expensive.

Document [Schmitt, C (Schmitt, C); Bovay, C (Bovay, C); Frossard, P (Frossard, P) *JOURNAL OF AGRICULTURAL AND FOOD CHEMISTRY*, Volume: 53, Issue: 23, Pages: 9089-9099, Published: Nov. 16, 2005] describes interactions between whey protein and Gum Arabic, in compositions comprising at most 5% by weight of whey protein. There is a need for compositions comprising higher concentrations of whey proteins.

Document [Schmitt, C (Schmitt, C); Sanchez, C (Sanchez, C); Thomas, F (Thomas, F); Hardy, J (Hardy, J) *FOOD HYDROCOLLOIDS*, Volume: 13, Issue: 6, Pages: 483-496, November 1999] describes compositions having complex coacervates of whey protein and Gum Arabic at acidic pH. The compositions comprise at most 5% by weight of whey protein. They are not subjected to heat treatment. There is a need for compositions comprising higher concentrations of whey proteins.

Document [Valim, M D (Valim, Melina D.)[1]; Cavallieri, A L F (Cavallieri, Angelo L. F.)[1]; Cunha, R L (Cunha, Rosiane L.)[1] *FOOD BIOPHYSICS*, Volume: 4, Issue: 1, Pages 23-31 (March 2009)] describes compositions comprising 12% by weight of whey protein and up to 0.5% by weight of Gum Arabic, corresponding to a ratio Gum Arabic to Whey Protein of 0.04. The aqueous solutions of whey proteins are subjected to a heat-induced gelation process, then Gum Arabic is added. The document teaches that introduction of such amount of Gum Arabic provides higher gelling (increased stress at rupture of gels). There is a need for providing contrary effects such as lower viscosity or reduced gelling to compositions having high concentrations of whey proteins.

Document [Weinbreck, F (Weinbreck, F); de Vries, R (de Vries, R); Schrooyen, P (Schrooyen, P); de Kruif, C G (de Kruif, C G) *BIOMACROMOLECULES*, Volume: 4, Issue: 2, Pages: 293-303] describes compositions having complex coacervates of whey protein and Gum Arabic, with a ratio of Gum Arabic to Whey Protein of ½. With such a ratio a whey protein concentration of 8% leads to total concentration of Whey Protein and Gum Arabic of 8%+0.5*8%=12%. Such concentrations were tested at a pH of 3.5, as reported on FIG. 7. The document suggests that in these conditions instability and formation of separate entities are observed. The compositions are not subjected to heat treatment There is a need for compositions at other pH, for compositions that are stable and/or for compositions that have other forms than dispersion of solid coacervates in aqueous medium.

Document [Weinbreck, F (Weinbreck, F); Wientjes, R H W (Wientjes, R H W) *JOURNAL OF RHEOLOGY*, Volume: 48, Issue: 6, Pages: 1215-1228, November-December 2004] describes rheological properties of compositions having complex coacervates of whey protein and gum arabic. The compositions comprise at most 3% by weight of whey protein. They are not subjected to heat treatment. There is a need for compositions comprising higher concentrations of whey proteins.

The invention addresses at least one of the problems or needs mentioned above with an aqueous composition comprising:
water,
at least 8.0% by weight of whey protein (WP), and
at least 2.0% by weight of Gum Arabic (GA),
wherein:
the pH is of from 5.0 to 9.0, and
the weight ratio GAWP between Gum Arabic and whey protein is higher than 0.25 and lower than 1.00.

The invention also concerns a process for making the compositions. The invention also concerns the use of Gum Arabic in the composition to control processing and/or texture, especially during or after a heat treatment.

Definitions

In the present application a shelf life refers to a storage period, at shelf temperature such as at ambient or at chilled temperature, of at least 7 days, preferably at least 14 days, preferably at least 30 days, after a final preparation step. The shelf life can be of up to 40 or 50 days for products to be stored at chilled temperature. The shelf life can be of several months, for example up to 3 or 6 months or even more for products to be stored at ambient temperature.

In the present application a chilled temperature refers to a temperature of from 2° C. to 10° C., preferably from 4° C. to 10° C., for example to a temperature of a refrigerator.

In the present application a room temperature or ambient temperature refers to a temperature of from 15° C. to 35° C., preferably from 20° C. to 25° C. A room temperature is typically used herein for a temperature at a production facility. An ambient temperature is typically used herein for a temperature after production, for example on shelves.

In the present specification, unless otherwise provided, the viscosity refers to the viscosity as measured, preferably after 10 s at a shear rate, preferably with a rheometer with 2 co-axial cylinders, for example with a Mettler® RM 180 or 200, at an indicated temperature and shear. The temperature is typically 10° C. or 30° C. The shear rate is typically 64 $s^{-1}$ or 1290 $s^{-1}$. If the temperature is not mentioned the temperature is to be 10° C. If the shear rate is not mentioned the shear rate is to be 64 $s^{-1}$.

In the present application the gel strength refers to the force (in grams) measured by a penetrometry texture analyser, for example, with a TA.XT2 texture analyzer, with the following settings:
mobile: a cylinder Probe 10, 1.3 cm diameter and 35 mm height
temperature: 10° C.
calibration for mobile: 5 kg
mobile speed: 0.2 mm/s
penetration distance: 15 mm
sensibility of detection: 0.5 g.

In the present specification a "viscous" composition refers to a composition that is not liquid or pourable. Preferably a viscous composition meets the following criteria: after 1 minute, at a room temperature, preferably at 20° C., a maximum of 10% by weight of the composition would flow out of a container with an opening, upon positioning the container vertically, such that the opening is at the lowest altitude. Viscous compositions encompass compositions with a gel texture. Preferably, a viscous composition has a viscosity of from 500 mPa·s to 50000 mPa·s, preferably from 1000 mPa·s to 10000 mPa·s, preferably from 1500 mPa·s to 5000 mPa·s, at 10° C. at 64 $s^{-1}$ or 10° C. at 1290 $s^{-1}$. Preferably a viscous composition has strength of at least 30 g, preferably at least 500 g, preferably at least 1000 g.

In the present invention, unless otherwise specified, the percentages are percentages by weight.

Product and Composition

The composition of the invention is a food composition. The composition is typically to be provided in a product comprising a container and the composition. The product is a food product comprising the composition to be administered orally, and a container wherein the composition is contained. In other words the container is the packaging of the composition. The product is typically a sealed product: the container comprising the composition is typically sealed before a first use. Upon a first use, the consumer typically provides an opening to the container with altering the container, for example by tearing or cutting a flexible part or by breaking a temper evidence on the cap.

The volume of composition can typically correspond to 70-100%, preferably 80-100%, of the maximum volume of the container.

The composition in the container has preferably a gel strength of from 1000 g to 8000 g, preferably from 1000 g to 5000 g, for example from 1000 g to 2800 g. Such a texture can allow the composition to be well dispensed from the container via the opening and/or with a spoon, while being appreciated in mouth.

The composition or product can be stored at a chilled temperature or at an ambient temperature.

Container

The container can be any food container, such as a cup, a bottle or a flexible container. The container is the packaging of the composition.

In one embodiment the container is a flexible container. By flexible container it is meant that the container comprises at least a part that is made of a flexible material, such as a monolayer or multilayer laminate, that can be substantially deformed by manipulating. The laminate can have for example a thickness of less than 0.5 mm, preferably less than 0.3 mm, for example less than 0.1 mm. The laminate typically exhibits barrier properties suitable for packaging food compositions. Examples of materials that can be used in the laminate include papers, metal foils or coatings, and plastic film or coatings.

The packaging can be for example a pouch. Flexible pouches are known by the one skilled in the art of packaging. They typically include a plied or folded part and a sealed part, typically a thermosealed part. Typically a laminate is handled and partially sealed to provide a filling opening, then the composition is filled via the filling opening, and then the pouch is closed by further sealing and/or by providing a pre-formed closure, such as a cap.

In a preferred embodiment the container is a pouch container known as doypack. In a preferred embodiment the container has an opening, preferably having a size of from 1 mm to 15 mm, preferably from 5 mm to 15 mm, preferably closed by a non-flexible cap. It is meant that the container is such that at least after a first use opening, the container is provided with the opening, said opening allowing the composition to be dispensed out of the container. The opening is preferably closed, for example with a tearable or cuttable portion or with a cap. In one embodiment, for example with caps, the opening can be closed again after first use. In one embodiment the opening cannot be closed again, without further means, after first use.

The container can be for example a container having a maximum volume of 50 ml (or 50 g) to 500 ml (or 500 g), for example from 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 200 ml (or 200 g) to 250 ml (or 250 g), or 250 ml (or 250 g) to 300 ml (or 300 g), or 300 ml (or 300 g) to 500 ml (or 500 g).

Composition

The composition is typically an aqueous composition, comprising water and ingredients. It is mentioned that a part of the water can come from ingredients used to prepare the composition. The composition can for example have a dry matter content of up to 60% by weight, preferably from 8% to 50% by weight, notably from 10% to 50% by weight. The composition can have a water content of from 92% to 50% by weight, notably from 90% to 50% by weight. The water can typically be the matrix or carrier of the composition, wherein the ingredients are introduced. Other matrix or carriers, can for example include milk-based liquids or fruit juices, either obtained directly from milk or fruits, or reconstituted by mixing powder(s) or concentrate(s) therefrom with water. In one embodiment the matrix or carrier is different from a milk-based liquid or from a fruit juice. In one embodiment the composition is different from a milk-based composition or from a fruit juice based composition. The water has preferably a low amount of minerals. The water is preferably demineralized water or osmosed water.

The composition has preferably an energy density of less than 200 kcal per 100 g. It is believed that compositions having an energy density higher than 200 kcal per 100 g would not be adapted to regular consumption by consumers that do not present food-related pathologies or other specific needs. Moreover such compositions would be loaded with carbohydrates and/or fats that can modify the rheology. The energy density is preferably lower than 150 kcal per 100 g, preferably lower than 120 kcal per 100 g, preferably lower than 110 kcal per 100 g. Fat preferably represents at most 25% of the energy, preferably at most 20%, for example from 5% to 20%. Carbohydrates preferably represent at most 65% of the energy, preferably at most 60%, for example from 40% to 60%. Protein preferably represents at least 20% of the energy, preferably at least 30%, for example from 30% to 50%.

The composition has a pH of from 5.0 to 9.0, preferably from 6.0 to 8.0, for example from 6.0 to 6.5, or from 6.5 to 7.0, or from 7.0 to 7.5, or from 7.5 to 8.0. The pH can be for example of from 6.5 to 7.5, for example from 6.8 to 7.2. It is believed that in this range the whey protein is typically in a form different from a colloidal suspension or a coacervate dispersion. In the composition the whey protein is typically at least partly solubilized in the water, optionally in the form of at least partially solubilized complex.

The composition can comprise pH adjustment agents and/or buffers. For example the composition can comprise citric acid. The composition can comprise a calcium complexing agent, for example a sequestrant. Examples include phosphates, preferably a sodium phosphate, such as trisodium phosphate.

In the composition the weight ratio GANVP between Gum Arabic and whey protein is higher than 0.25 and lower than 1.00. This ratio can be for example of from 0.25 to 0.33, or from 0.33 to 0.50, or from 0.50 to 0.66, or from 0.66 to 0.75, or from 0.75 to 1.00.

The composition preferably has an ionic strength of higher than 100 mM, preferably higher than 150 mM, preferably higher than 200 mM. Higher ionic strengths are believed to help in providing viscous and/or gel textures.

The composition preferably comprises sugar. Sugar helps in providing organoleptic properties appreciated by consumers. Additional sugar can help in the process of making the composition, by preventing or postponing fouling or gelling in the equipment. The composition can for example comprise from 2.5% to 15.0% by weight of sugar, for example from 0.1% to 2.5%, or from 2.5% to 5.0%, or from 5.0% to 8.0%, or from 8.0% to 11.0%, or from 11.0% to 15.0%. The composition can comprise at most 8.0% by weight of sugar.

The composition can comprise at least one polysaccharide different from the Gum Arabic, herein referred to as "further polysaccharide". Further polysaccharides can help in controlling gelling of the composition, for example in preventing or postponing gelling or fouling in the equipment, and/or by moderating the gel strength of the composition. The further polysaccharide can participate in protecting the whey protein, and/or in hindering aggregation. The further polysaccharide can participate in complexing and/or chelating divalent cations, such as calcium, that would participate in gelling otherwise. The amount of further polysaccharide can be for example of from 0.1% to 5.0% by weight, preferably from 0.5% to 2.0%. Examples of further polysaccharides that can be present in the composition include starches, galactomannans, such as guar gums and locust bean gums, carrageenans, xanthane gum, maltodextrines or pectins.

In one embodiment the composition comprises at least one native starch, and at least one further different polysaccharide. The further different polysaccharide can have suspending and/or viscosity enhancing and/or stability enhancing properties. Such further different polysaccharides for example include other starches such as modified starches, for example tapioca chemically modified starches, such as National Frigex™ NSC marketed by Ingredion®. Other further different polysaccharides include for example galactomannans, such as guar gums and locust bean gums, carrageenans, xanthane gum, maltodextrines or pectins.

The composition preferably comprises some fat, preferably in a low amount. If present the amount of fat can be of at least 0.1% by weight, preferably at least 0.5%. The composition can comprise for example from 0.1% to 5.0% by weight of fat, preferably from 0.5% to 2.5%. The fat or a part thereof can be an oil, preferably a vegetal or animal oil such as fish oil. The oil can be present for example in an amount of from 0.1% to 5.0% by weight, preferably from 0.5% to 2.5%.

The composition can comprise some nutrients, different from the proteins, sugar and fat, preferably nutrients known as participating in a muscle-relating function. Examples include vitamins, such as vitamin C, vitamin B such as vitamin B6 and vitamin B9.

The composition can comprise organoleptic agents. Such agents are known for the one skilled in the art and are typically used to provide or adjust the taste or mouthfeel of the composition. The organoleptic modifiers can be for example:
nuts pastes or extracts such as almond paste, hazelnuts compounds, chocolate, etc.
cereals,
fruits or fruits extracts,
sweeteners different from sugar.

In one embodiment at least a part of the organoleptic modifiers are provided via an intermediate preparation, often referred to as fruit preparation. Such preparations are known by the one skilled in the art, and are further detailed below.

The composition has preferably a gel strength of lower than 8000 g, preferably of lower than 5000 g. The gel strength can be for example of from 1000 g to 8000 g, preferably from 1000 g to 5000 g, for example from 1000 g to 2800 g. Such a texture allows the composition to be well dispensed from the container via the opening and/or with a spoon, while being appreciated in mouth.

The composition preferably has a viscosity at 10° C. at 64 s$^{-1}$ of lower than 1500 mPa·s, preferably lower than 1000 mPa·s.

The composition can be stored at a chilled temperature or at an ambient temperature.

Whey Protein

The composition comprises at least 8.0% by weight, preferably at least 8.5%, preferably at least 9.0%, preferably at least 9.5%, preferably at least 10.0%, preferably at least 10.5%, preferably at least 11.0%, preferable at least 11.5%, preferably at least 12.0%, preferably at least 12.5%, preferably at least 13.0%, preferably at least 13.5%, preferably at least 14.0%, of whey protein. The amount of whey protein can be for example of lower than 20.0%, for example from 10.0% to 20.0%. Preferably the composition is an aqueous composition comprising from 10.0% to 17.5% by weight of whey protein, for example from 10.5% to 17.5%. The whey protein is typically provided in the composition from a whey protein source or ingredient.

Whey proteins are known by the one skilled in the art, and are commercially available. Whey is typically manufactured by coagulating milk, and is typically obtained as a by-product of cheese or fermented milk production. Whey can be sweet whey or acid whey, from which the whey proteins are concentrated. The concentration of proteins in whey is typically increased by removing lipids and other non-protein materials. For example spray drying after membrane filtration separates the proteins from whey. Whey protein is the collection of globular proteins isolated from whey. Whey proteins are typically comprised of a mixture of α-lactalbumin, β-lactoglobulin, and optionally serum albumin. The amounts of these compounds in the whey protein can vary. Typical proportions are for example the following: 60-70 wt % α-lactalbumin, 20-30 wt % β-lactoglobulin, 0-10 wt % serum albumin.

It is mentioned that the whey proteins of the invention are typically non-hydrolyzed whey proteins. Whey proteins that can be used in the invention include Whey Protein Concentrates (WPC) and, preferably Whey Protein Isolates (WPI). In certain embodiments the protein present in the whey protein source, for example a whey protein concentrate (WPC), a whey protein isolate (WPI), or a blend of whey protein sources including a blend of WPCs or WPIs or both, comprises, consists essentially of, or consists of non-hydrolysed whey protein. In one embodiment, the protein present in the WPC or WPI comprises at least 65% non-hydrolysed protein, at least 70% non-hydrolysed protein, at least 75% non-hydrolysed protein, at least 80% non-hydrolysed protein, at least 85% non-hydrolysed protein, at least 90% non-hydrolysed protein, at least 95% non-hydrolysed protein, or at least 99% non-hydrolysed protein. In one embodiment, the WPC or WPI is substantially free of hydrolysed protein.

In one embodiment, the whey protein is provided by an ingredient that comprises a protein content of 35% to 95% by weight of the dry matter of the ingredient.

A whey protein concentrate (WPC) is a fraction of whey from which lactose has been at least partially removed to increase the protein content to at least 20 wt %. Preferably the WPC has at least 40 wt %, more preferably at least 55 wt %, even more preferably at least 65 wt % and most preferably at least 75 wt % of the total solids as whey protein. Preferably, the relative proportions of the various whey proteins are substantially equivalent to those of the whey from which the WPC is obtained. Preferably, the WPC is an evaporated whey protein retentate. WPCs are generally prepared by ultrafiltration and/or diafiltration of whey. In one embodiment the whey protein ingredient is an ultrafiltrated WPC. A whey protein isolate (WPI) is a WPC having at least 90% of the total solids as whey protein. Preferably, the protein composition in the ingredient is substantially that of the whey from which it is obtained.

The whey protein ingredient, preferably WPI, might comprise an amount of minerals, including for example sodium and/or calcium and other minerals. Preferably the amount of minerals in the whey protein is of less than 3250 mg per 100 g, preferably preferably less than 2000 mg per 100 g. Preferably the amount of calcium in the whey protein is of less than 300 mg per 100 g, preferably less than 200 mg per 100 g, preferably less than 100 mg per 100 g. Preferably the amount of sodium in the whey protein is of less than 500 mg per 100 g, preferably less than 300 mg per 100 g, preferably less than 200 mg per 100 g. Preferably the amount of minerals in the whey protein is of less than 3250 mg per 100 g, and the amount of calcium in the whey protein is of less than 300 mg per 100 g, and the amount of sodium in the whey protein is of less than 500 mg per 100 g. For example the amount of minerals in the whey protein can be of less than 2000 mg per 100 g, and the amount of calcium in the whey protein can be of less than 200 mg per 100 g, and the amount of sodium in the whey protein can be of less than 300 mg per 100 g.

Whey proteins in a native state are in a globular form. Upon processing, for example upon heating, whey proteins can be denatured, being thus at least partially in a form that does not correspond to the globular native form, for example in a non-globular unfold form. This phenomenon is known by the one skilled in the art. The whey protein ingredient is typically an ingredient wherein the whey protein is not or is slightly in a denaturated state. Preferably at most 45% of the whey protein in the ingredient is in a denaturated state, preferably at most 35%. In one embodiment 5-30% of the whey protein in the ingredient is in a denaturated state. It is mentioned that, in the composition after having undergone a preparation process, some of the whey protein can be in a denaturated state, preferably with from more than 45% to 90% being in denaturated state, for example from 60% to 80%.

In the particular embodiment the whey protein has at least one of the following features:
caseinomacropeptide (CMP) amount, if present, of lower than 15%,
divalent cations amount of lower than 0.5%, and
denaturation rate of lower than 5%, preferably lower than 2%.

It is mentioned that the whey proteins, along the preparation process of the composition, from the whey protein source or ingredient to the intermediate preparations and to the final composition, typically do not undergo a drying step and/or a concentration step. In this aspect, the preparation, the composition, and the process to make the same are typically different from compositions and processes to make whey protein ingredients to be added in a formulation.

The composition can comprise some other proteins different from whey proteins, for example a casein compound such as a non-micellar casein compound such as sodium caseinate, vegetal proteins such as soy protein or pea protein. If present other proteins represent at most 25% by weight, preferably at most 20%, preferably at most 15%, preferably at most 10%, preferably at most 5%, preferably at most 1%, of the total proteins.

It is mentioned that the composition can comprise a leucine component, as part of the whey protein. The composition can comprise some added free leucine, preferably L-leucine, added to further increase the leucine content. The total leucine can be thus adjusted, if needed, to be for example of 1% to 2% by weight of the composition, of which from 10% to 50% by weight or number is preferably free-leucine.

Gum Arabic

The composition comprises Gum Arabic (GA). Gums Arabic are known by the one skilled in the art and are commercially available. They are also referred to as Acacia Gum.

Acacia gum is a natural, soluble food fibre. It is a macromolecule with high molar mass (typically with a weight-average molecular weight between $4.10^5$ and $2.10^6$ g/mol). Its intrinsic viscosity is typically less than 0.2 dl/g (as measured for example according to Al-Assaf et al, Food Hydrocolloids, 2005, 19, 647-667; Flindt et al, Food Hydrocolloids, 2005, 19, 687-701). Acacia Gum is an acacia exudate, preferably solely purified using a physical process well known to those skilled in the art, having the steps of grinding, dissolving in water, filtering, centrifuging, microfiltrating, then spray drying or granulating. There are two types of Acacia Gum: acacia seyal and acacia senegal. Their structures are slightly different. They can however be distinguished by a very different rotating power and by their proportion of simple sugars (46% arabinose in acacia seyal and 24% in acacia senegal). Advantageously, the Acacia Gum is acacia senegal, acacia seyal or their mixtures. By acacia senegal gum is meant a gum produced from natural exudates or produced by tapping stems or branches of trees of genus Acacia senegal. Examples of Acacia Gums that can be used include Fibergum™ ranges marketed by Nexira®, such as Fibergum™ B.

The amount of Gum Arabic can be for example of at least 2.0% by weight, for example at least 3.0%, or at least 4.0%, for example at least 5.0%, for example at least 6.0%, for example at least 7.0%. The amount of Gum Arabic is preferably of at most 20.0% be weight, preferably at most 15.0%, preferably at most 10.0%. It is mentioned that the higher the concentration of whey protein is, the higher the concentration of Gum Arabic is preferred. It is mentioned that the higher the amount of whey protein is, the higher the ratio between Gum Arabic and whey protein is preferred.

Examples of suitable compositions are the following (by weight):
at least 10.0% whey protein and at least 3.0% Gum Arabic,
at least 12.0% whey protein and at least 4.0% Gum Arabic,
at least 14.0% whey protein and at least 5.0% Gum Arabic, preferably at least 6.0% Gum Arabic.

Native Starch

The composition preferably further comprises a native starch, preferably a non-pregelatinized starch. Non-pregelatinized starch refers to a starch that has not undergone modifications to render it soluble in cold water, such as swelling and/or dissolution. Non pre-gelatinized native starches typically have macromolecular amylopectin and optionally amylose in a similar arrangement that in native state, without significant rearrangement for example of the microcrystalline structure and/or inclusion of water molecules. It is mentioned that non-pregelatinized starches exclude gelatinized starches. The native starch is not chemically modified. It is also referred to as an unmodified starch. Chemical modification of starch is any way usually performed with some preliminary swelling and or dissolution corresponding to a pregelatinization and/or to gelatinization. The non-pregelatinized native starch can be a native maize starch or waxy maize starch, for example with an amylose content of from 0% to 50%, preferably from 0% to 30%, for example from 0% to 5%, or from 5% to 10%, or from 10% to 15%, or from 15% to 20%, or from 20% to 25%, or from 25% to 30%. These contents are typically by weight.

It is mentioned that pregelatinization processes as well as both pregelatinized starches and non-pregelatinized starches are known by the one skilled in the art and available on the market. Examples of pregelatinized starches include N4300 and N2300 marketed by Ingredion®. Examples of non-pregelatinized native starch include Amioca powder TF, marketed by Ingredion®.

The amount of native starch, preferably non-pregelatinized native starch, is typically of from 0.10% by weight to 1.00%, for example from 0.10% to 0.50%, or from 0.50% to 0.99%.

It has been found that native starch can further participate in controlling gelling of the composition, especially upon heat-treating, for example in preventing or postponing gelling or fouling in the equipment, and/or by moderating the gel strength of the composition. The native starch can participate in protecting the whey protein, and/or in hindering aggregation. The native starch can participate in complexing and/or chelating divalent cations, such as calcium, that would participate in gelling otherwise.

Process for Making the Product

The product can be prepared by any appropriate process. Typically the product is prepared by a process comprising the following steps:

Step A) preparing the composition, and

Step B) filling the composition in the container.

Preferably the composition, during its preparation, in processing equipments, is in a liquid state. The viscosity can typically increase, up to gel state, after preparation, during a storage in an appropriate tank before filling, and/or during storage of the product for example at a chilled temperature or at ambient temperature. Thus the process can comprise a step of: Step C) storing the composition in the container to allow a gel formation. In one embodiment the process comprises a maturation step between step A) and step B). It is mentioned that the maturation step can be the last step of step A).

In one embodiment:
step A) is carried out during from 1 minute to 5 hours, preferably from 25 min to 4 hours, such as from 30 minutes to 4 hours,
an optional maturation period of up to 6 hours is allowed between step A) and step B).

The temperature during the maturation period can be of from 4° C. to 45° C. In one embodiment the temperature decreases from a temperature at the end of step A), for example above 45° C., to a final temperature being room temperature, or a chilled temperature. In one embodiment the maturation period is performed at stable temperature, for example at a room temperature or at a chilled temperature. The maturation can be performed in a tank.

Process for Making the Composition

The composition can be prepared, for example as Step A) above, according to any appropriate process. In this section the process refers to the process of making the composition.

The process of making the composition can comprise the steps of:
a) preparing an aqueous mixture comprising the water, the whey protein, the Gum Arabic and the optional native starch, and
b) heat-treating at a temperature of at least 70° C., preferably at least 75° C., preferably at least 85° C.

Step a) can comprises a step of hydrating the Gum Arabic, then adding the whey protein, then optionally adding the optional native starch. Step b) can be performed for example by Direct Steam Injection. The process can comprise a homogenization step c), preferably performed after heat treatment step b). The process can comprise a cooling step after the heat treatment step b) or an optional homogenization step c).

The process of making the composition typically involves a heat-treatment, such as pasteurization or sterilization, to prevent any contamination. For neutral compositions having a pH of from 5.0 to 9.0, preferably 6.0 to 8.0, a sterilization is preferred. For neutral products to be stored at ambient temperature a sterilization is preferred. Given the high concentration of whey proteins, and the sensitivity to heat of these, that can result in a gel formation in the equipments and/or to fouling the equipments, it is preferred that the heat treatment be performed very quickly, typically with a Direct Steam Injection (DSI) technology. Thus, the preparation process can involve a Direct Steam Injection step.

It is found practical to prepare at least a composition comprising the whey, with a heat treatment, preferably involving a Direct Steam Injection step, and optionally mix one or several preparations. Thus the process can comprise the following steps:
Step 1) preparing a Mass 1 composition comprising the whey protein, the Gum Arabic and optionally all or a part of the optional native starch, and
Step 2) adding at least one aqueous preparation, preferably comprising at least one further polysaccharide, preferably all or a remaining part of native starch or a further different polysaccharide.

Mass 1 is a composition comprising the proteins and the Gum Arabic. At least one aqueous preparation can be added to Mass 1. The at least one added aqueous preparation that is added can comprise an amount of Gum Arabic and/or at least one further polysaccharide. The addition of such a further polysaccharide, at such a later stage can provide a modified texture and/or control thereof. An at least one aqueous preparation comprising at least one further polysaccharide can thus be also referred to as a texture control preparation.

The at least one aqueous preparation is typically added to adjust the rheology and/or the taste. In one embodiment the ratio by weight between Mass 1 and the at least one aqueous preparation is of at least 50/50, preferably between 60/40 to 90/10. If no preparation is added Mass 1 is the composition.

In one embodiment the at least one aqueous preparation comprises a Mass 2 composition comprising an at least one further polysaccharide, and optionally a Mass 3 fruit preparation.

In one embodiment the at least one aqueous preparation comprises a Mass 2 composition comprising an at least one further polysaccharide, and at least a Mass 3 fruit preparation.

In one embodiment Mass 3 comprises at least one further polysaccharide, preferably a further different polysaccharide.

In one embodiment the at least one aqueous preparation optionally comprising the at least one further polysaccharide, preferably a Mass 2, comprises sugar. In one embodiment Mass 1 comprises sugar. In one embodiment, Mass 1 and the at least one aqueous preparation optionally comprising the at least one further polysaccharide, preferably a Mass 2, comprise sugar.

In a preferred embodiment, the further polysaccharide of the at least one aqueous preparation is a native starch.

The addition to Mass 1 of the at least one aqueous preparation, typically a Mass 2 and/or a Mass 3, can be performed by any appropriate means. For example one can mix the Mass 1 and Mass 2, and then optionally mix a Mass 3. Such mixing operations are known by the one skilled in the art.

Mass 1 typically comprises the proteins of the composition, preferably all the protein of the composition. Mass 1 is typically an aqueous composition. The water can typically be the matrix or carrier of Mass 1, wherein the ingredients are introduced. Other possible matrix or carriers are those described above for the composition. Examples include milk-based liquids, either obtained directly from milk, or reconstituted by mixing powder(s) or concentrate(s) with water. The water has preferably a low amount of mineral. The water is preferably demineralized water or osmosed water.

The concentrations of ingredients in Mass 1 can be adjusted to fit with the concentrations provided above for the composition, depending on the dilution that can be provided by adding the at least one aqueous preparation, if added. As to adjustment of the concentrations, particularly the concentration in proteins, preferably whey proteins, the concentration can be for example increased by at least 10%. Thus in Mass 1, the concentration in whey proteins can be for example of at least 8.0% by weight, preferably at least 8.5%, preferably at least 8.8%, preferably at least 9.35%, preferably at least 9.5%, preferably at least 10.0%, preferably at least 10.45%, preferably at least 11.0%.

Preferably Mass 1 is an aqueous composition comprising from 10.0% to 17.5% by weight of whey protein, or from 11.0% to 19.25% by weight of whey protein. Mass 1 can comprise some of the sugar of the composition, typically in an amount such that the weight ratio between whey proteins and sugar is of from 0.5 to 1.0, or from 1.0 to 1.7, preferably 1.22 to 1.55. Mass 1 can comprise the leucine and/or at least a part of the organoleptic modifiers. Mass 1 can comprise some of the polysaccharide, typically in an amount of from 0.1% to 5.0% by weight, preferably from 0.5% to 2.0%, preferably in an amount of at least 10% more than the amounts mentioned above for the composition, if Mass 1 is further mixed with an aqueous preparation.

The pH of Mass 1 is preferably as mentioned above.

A process of making the composition, for example a Mass 1 composition, comprises the steps of preparing an aqueous mixture comprising the whey protein and the non-micellar casein compound and heat-treating. The following steps can be implemented:
Step a') Powdering,
Step b') Optionally Oil injection,
Step c') Homogenization,
Step d') Pre-Heating,
Step e') Direct Steam Injection (DSI),
Step f') Flash cooling,
Step g') Further cooling and optionally Storing.

It is mentioned that step a') and step g') can be batch steps, while steps b') to f') are typically continuous steps.

Step a') is a powdering step. In this step powder ingredient(s), typically the whey protein, Gum Arabic and optionally native starch, are introduced in a liquid matrix or carrier, such as those described above, typically water. Such a step and equipments therefore, for example triblenders, are quite conventional and known by the one skilled in the art. In a preferred embodiment the ingredients are handled and processed with avoiding introduction of gas. The process can otherwise comprise a degasing step, preferably at some stage before the DSI step, preferably before the pre-heating step, preferably before the homogenization step. Step a') can be carried out at a room temperature.

It is mentioned that the mixture obtained at step a') can be subjected to a pre-heating step to a temperature of from higher than room temperature to about 75° C. after step a').

If the composition comprises some oil, then the oil can be typically introduced by injection at a step b'), for example by an in-line injection.

Step c') is a homogenization step. Such steps are known by the one skilled in the art. The homogenization can be for example performed in conventional homogenizers at a pressure of from 20 bars to 300 bars (20 to 300 $10^5$ Pa), preferably from 50 bars to 250 bars (50 to 250 $10^5$ Pa), for example at 50 bars (50 $10^5$ Pa). It is preferred that the homogenization be performed before the DSI step. It has been found that subjecting Mass 1 to high shears, such as shear provided by homogenization can lead to increasing gelling of the proteins in the equipments and/or to accelerating fouling of the equipments. The same can apply to step c) mentioned above.

Step d') is a pre-heating step, before the major heat treatment by DSI. It is mentioned that if a pre-heating step has been performed before oil injection and/or homogenization, then the pre-heating step d') is performed such that the temperature is further increased. It is preferred that the pre-heating be performed at a quite mild temperature, for example at a temperature of from 50° C. to 75° C., preferably from 55° C. to 70° C., preferably from 60° C. to 65° C. Such mild temperatures are believed to provide enough temperature increase before the DSI, while preventing or postponing gelling of the proteins and fouling of the equipments at later stage, for example at DSI step or after.

Step e') is a Direct Steam Injection (DSI) step. Such steps and appropriate equipments are known. These allow subjecting compositions to high temperatures during a short period, and thus allow sterilizing products that are heat sensitive. Preferably the DSI is performed at a temperature of from 140° C. to 150° C., preferably at a temperature of 145° C. Preferably the treatment time is of from 1 s to 10 s, preferably from 2 s to 5 s. The pressure can be for example of 1 bar ($10^5$ Pa). The same applies to step b) mentioned above.

At step f) a flash cooling is performed, to decrease efficiently the temperature. Such a step is typically performed in a flash cooler, and involves introducing the composition in a vacuum chamber. The temperature after the flash cooling step is preferably of from 50° C. to 65° C., preferably from 55° C. to 63° C.

At step g') a further cooling is performed, to reach a desired storage and further processing temperature, for example of from 4° C. to 45° C. In one embodiment the temperature decreases from a temperature at the end of step A), for example above 45° C., to a final temperature being a room temperature, or a chilled temperature. It is noted that step g') can be a maturation step as mentioned above.

After step g') the composition, for example a Mass 1, is typically a liquid, with a viscosity of less than 1000 mPa·s at 1290 $s^{-1}$ at 30° C., preferably at 10° C., preferably of less than 500 mPa·s at 1290 $s^{-1}$ at 30° C., preferably at 10° C., preferably of less than 100 mPa·s at 1290 $s^{-1}$ at 30° C., preferably at 10° C., or of less than 1500 mPa·s, preferably less than 1000 mPa·s at 10° C. at 64 $s^{-1}$.

The composition, for example a Mass 1, can be then further processed. In one embodiment Mass 1 is temporary stored, before being introduced in the container or mixed with other preparations. For example it can be transferred to a storage tank and stored, for example at a temperature of from 2° C. to 35° C., for example at a room temperature or at a chilled temperature. The storage time is preferably of at most 24 h, preferably at most 6 h, for example up to 3 hours.

Steps b') to f') that are typically continuous steps, especially step e'), can run for a certain period of time. Upon running the equipments might progressively generate fouling that can reach a level at which stopping and cleaning would be required. The above-described process of making Mass 1 is found efficient, with allowing running periods of at least 25 min, preferably at least 30 minutes or even more, for example at least 1 minute, preferably at least 30 minutes, preferably at least 1 hour, preferably at least 3 hours, typically up to 6 hours, for example between 25 minutes and 4 hours, or between 30 minutes and 4 hours.

Mass 2 can be for example an aqueous composition comprising water and ingredients, for example the further polysaccharide and optionally sugar. Mass 2 is also referred to as a syrup. Mass 2 can comprise some further ingredients such as organoleptic modifiers, or some nutrients. It is mentioned that a part of the water in Mass 2 can come from ingredients used to prepare the composition. The composition can for example have a dry matter content of from 0.5% by weight to 50% by weight, preferably from 1% to 20% by weight. Mass 2 can have a water content of from 0.5% to 99.5% by weight such as 50% to 99.5% by weight, preferably from 1% to 80% by weight such as 80% to 99% by weight. The water can typically be the matrix or carrier of Mass 2, wherein the ingredients are introduced. Other possible matrix or carriers are those described above for the composition. Examples include milk-based liquids, either obtained directly from milk, or reconstituted by mixing powder(s) or concentrate(s) with water. In one embodiment the matrix or carrier is a milk-based liquid. In one embodiment Mass 2 is a milk-based composition. The water has preferably a low amount of mineral. The water is preferably demineralized water or osmosed water.

Mass 2 typically comprises at least one further polysaccharide, preferably in an amount of from 0.5% to 3.5% by weight. The further polysaccharide preferably comprises a native starch, preferably a non-pregelatinized native starch. The further polysaccharide might comprise other starches such as modified starches, for example chemically and/or physically modified starches, for example modified with cross-linkages. Such other starches include for example pre-gelatinized starches.

In one embodiment Mass 2 comprises at least one native starch, and at least one further different polysaccharide. The further different polysaccharide can have suspending and/or viscosity enhancing and/or stability enhancing properties. Such further different polysaccharides for example include other starches such as modified starches, for example tapioca chemically modified starches, such as National Frigex™ NSC marketed by Ingredion®. Other further different polysaccharides include for example galactomannans, such as guar gums and locust bean gums, carrageenans, xanthane gum, maltodextrines or pectins.

Mass 2 can comprise sugar, preferably in an amount of from 1% to 20% by weight, for example from 5% to 10% by weight. The amount of sugar in Mass 2 can be of lower than 8.0%.

Mass 2 can be prepared by any appropriate process. Preferred processes involve a heat treatment step to ensure pasteurization and/or sterilization.

If the composition comprises some nutrients, these are preferably added in the at least one aqueous preparation such as Mass 2 or Mass 3.

Mass 3 is typically a fruit preparation. These are intermediate preparations comprising fruit and/or cereals, typically used for imparting a fruit and/or cereal taste and/or mouthfeel to food products such as dairy products.

The fruit preparation typically comprises fruits. Herein fruits refer to any fruit form, including for example full fruits, pieces, purees, concentrates, juices, etc.

Typically a fruit preparation can be added in an amount of 5-35% by weight with reference to the total amount of composition.

The fruit preparation typically comprises a stabilizing system, having at least one stabilizer. The stabilizing system can comprise at least two stabilizers. Such stabilizers are known by the one skilled in the art. They typically help in avoiding phase separation of solids, for examples of fruits or fruits extracts and/or in avoiding syneresis. They typically provide some viscosity to the composition, for example a viscosity (Bostwick viscosity at 20° C.) of from 1 to 20 cm/min, preferably of from 4 to 12 cm/min.

The stabilizing system or the stabilizer can for example be a starch, a pectin, a guar, a xanthan, a carrageenan, a locust bean gum, or a mixture thereof. The amount of stabilizing system is typically of from 0.5 to 5% by weight.

The fruit preparation can typically comprise organoleptic modifiers. Such ingredients are known by the one skilled in the art.

The organoleptic modifiers can be for example sweetening agents different from sugar, coloring agents, cereals and/or cereal extracts.

Examples of sweetening agents are ingredients referred to as High Intensity Sweeteners, such as sucralose, acesulfamK, aspartam, saccharine, rebaudioside A or other steviosides or stevia extracts.

Examples of fruits include for example strawberry, peach, apricot, mango, apple, pear, raspberry, blueberry, blackberry, passion, cherry, and mixtures or associations thereof, such as peach-passion.

The fruits can be for example provided as:
- frozen fruit cubes, for example 10 mm fruit cubes, for example Individual Quick Frozen fruit cubes, for example strawberry, peach, apricot, mango, apple, pear fruit cubes or mixtures thereof,
- Aseptic fruit cubes, for example 10 mm fruit cubes, for example strawberry, peach, apricot, mango, apple or pear fruit cubes or mixtures thereof,
- fruit purees, for example fruit purees concentrated from 2 to 5 times, preferably 3 times, for example aseptic fruit purees, for example strawberry, peach, apricot, mango, raspberry, blueberry or apple fruit purees or mixtures thereof,
- single aseptic fruit purees, for example strawberry, raspberry, peach, apricot, blueberry or apple single aseptic fruit purees or mixtures thereof,
- frozen whole fruits, for example Individual Quick Frozen whole fruits, for example blueberry, raspberry or blackberry frozen whole fruits, or mixtures thereof,
mixtures thereof.

The ingredients and/or components of fruit preparation and the amounts thereof are typically such that the composition has a brix degree of from 1 to 65 brix, for example from 1 to 10 brix, or from 10 to 15 brix, or from 15 to 20 brix, or from 20 to 25 brix, or from 25 to 30 brix, or from 30 to 35 brix, or from 35 to 40 brix, or from 40 to 45 brix, or from 45 to 50 brix, or from 50 to 55 brix, or from 55 to 60 brix, or from 60 to 65 brix.

The fruit preparation can for example comprise fruit in an amount of from 30% to 80% by weight, for example from 50 to 70% by weight.

The fruit preparation can comprise water. It is mentioned that a part of the water can come from ingredients used to prepare the fruit preparation, for example from fruits or fruit extracts or from a phosphoric acid solution.

The fruit preparation can comprise pH modification agents such as citric acid. The fruit preparation can have a pH of from 2.5 to 5, preferably of from 2.8 to 4.2.

Method of Use

The composition obtained by the process is typically to be orally ingested. It presents a texture and/or mouthfeel appreciated by consumer.

Upon use the composition is dispensed out of a container. To do so the user can use a spoon if the container is not a flexible container, or, if the container is a flexible container, typically apply some pressure on the flexible part of the container to force the composition out of an opening. Thus the dispensing can be performed by applying a force on the container, preferably by pressing the container, preferably with a human hand. The opening can have for example a size (length, width or diameter for example) of from 1 mm to 15 mm. This dispensing is typically performed via an opening having a size of from 1 mm to 15 mm. In a preferred embodiment the dispensing is performed in the mouth of a human, for the composition to be orally ingested. It is however not excluded that the composition be dispensed in a cup or on a plate or on a spoon and then be ingested.

When dispensed out of the container, typically via the opening, the composition presents a texture and/or mouthfeel appreciated by consumer. It is mentioned that the dispensing through the opening might provide some shear and might slightly change the texture and/or mouthfeel of the composition. Such slightly modified texture and/or mouthfeel are appreciated by consumer.

Further details or advantages of the invention might appear in the following non limitative examples.

EXAMPLES

Example 1

The compositions of Table 1 (wherein amounts are given as % by weight) are prepared, according to the procedure below. The letter "c" designates a comparative example.

Procedure

The compositions are prepared in apparatus Thermomix MT31 marketed by Vorwerk, equipped with the anchor agitator and the blades.

1) At room temperature, put water into the bowl
2) Add Almond Paste
3) Mix 30 seconds at speed 2
4) Add and hydrate Acacia Gum, then add whey protein, then add native starch
5) Mix 1 hour at speed 2
6) Increase temperature to 70° C. in 10 minutes, and hold temperature with mixing at speed 1
7) Visually check appearance of the mix and note time at which a gel visually appears
8) Cool to room temperature Evaluations Time before gel: Time in minutes at which a gel visually appears.

The results are reported in table 1.

TABLE 1

| Ingredient | Example 1.1c | Example 1.2c | Example 1.3 | Example 1.4 |
|---|---|---|---|---|
| WPI Lacprodan ® 9224, Arla ® | 14.4 | 14.4 | 14.4 | 14.4 |
| Trisodium Phosphate | 0.2 | 0.2 | 0.2 | 0.2 |
| Native Starch: Amioca Powder TF, Ingredion ® | 0.75 | 0.75 | 0.75 | 0.75 |
| *Acacia* Gum: Fibergum ™ B, Nexira ® | 2.0 | 3.0 | 4.0 | 8.0 |
| Cristal Sugar | 0.0 | 0.0 | 0.0 | 0.0 |
| Almond Past 95%, Fruisec ® | 2.2 | 2.2 | 2.2 | 2.2 |
| Water | qs | qs | qs | qs |
| Ratio GA/WP | 0.14 | 0.21 | 0.28 | 0.56 |
| pH | 7.17 | 7.17 | 6.70 | 6.41 |
| Time before gel | 19 | 23 | More than 100: No gel | More than 100: No gel |

This example shows that using a ratio GA/WP above 0.25 surprisingly prevents gel formation upon heating.

The invention claimed is:

1. A heat-treated aqueous liquid composition comprising:
water,
at least 8.0% by weight of whey protein,
at least 2.0% by weight of Gum Arabic, and
0.10% to 1.00% by weight of native starch,
wherein the pH is of from 6.5-7.5,
wherein the composition has a viscosity of lower than 500 mPa·s at 10° C. and at 1290 s$^{-1}$,
wherein the weight ratio GA/WP between Gum Arabic and whey protein is higher than 0.25 and lower than 1.00,
wherein the whey protein is at least partly solubilized in the water, optionally in the form of at least a partially solubilized complex, and wherein the whey protein is not aggregated, and
wherein the heat-treated aqueous composition is obtained by a process comprising the steps of:
a) preparing an aqueous mixture comprising the water, the whey protein and the Gum Arabic, wherein the whey protein is a whey protein concentrate, a whey protein isolate or a mixture thereof, wherein the whey protein concentrate, whey protein isolate or mixture thereof consists of the whey protein, and
b) heat-treating the aqueous mixture at a temperature of at least 70° C.

2. The composition according to claim 1, wherein the Gum Arabic is Acacia Senegal Gum.

3. The composition according to claim 1, wherein the concentration of whey protein is of at least 10.0%.

4. The composition according to claim 3, wherein the concentration of whey protein is of at least 14.0%.

5. The composition according to claim 1, having a gel strength of lower than 8000 g.

6. The composition according to claim 5, wherein the gel strength is lower than 5000 g.

7. The composition according to claim 1, comprising at most 8.0% by weight of sugar.

8. The composition according to claim 1, further comprising a calcium complexing agent.

9. The composition according to claim 8, wherein the calcium complexing agent is trisodium phosphate.

10. The composition according to claim 1, wherein the whey protein is the whey protein isolate.

11. The composition according to claim 1, which is pasteurized or sterilized.

12. The composition according to claim 1, wherein step b) is performed by Direct Steam Injection.

* * * * *